INVENTOR
BERNARD H. KOOB
BY Parham + Bates
ATTORNEYS

June 5, 1951 B. H. KOOB 2,555,448
SYNCHRONIZING DRIVE MECHANISM
Filed June 28, 1949 10 Sheets-Sheet 2

INVENTOR
BERNARD H. KOOB
BY *Parham + Bates*
ATTORNEYS

June 5, 1951  B. H. KOOB  2,555,448
SYNCHRONIZING DRIVE MECHANISM
Filed June 28, 1949  10 Sheets-Sheet 4
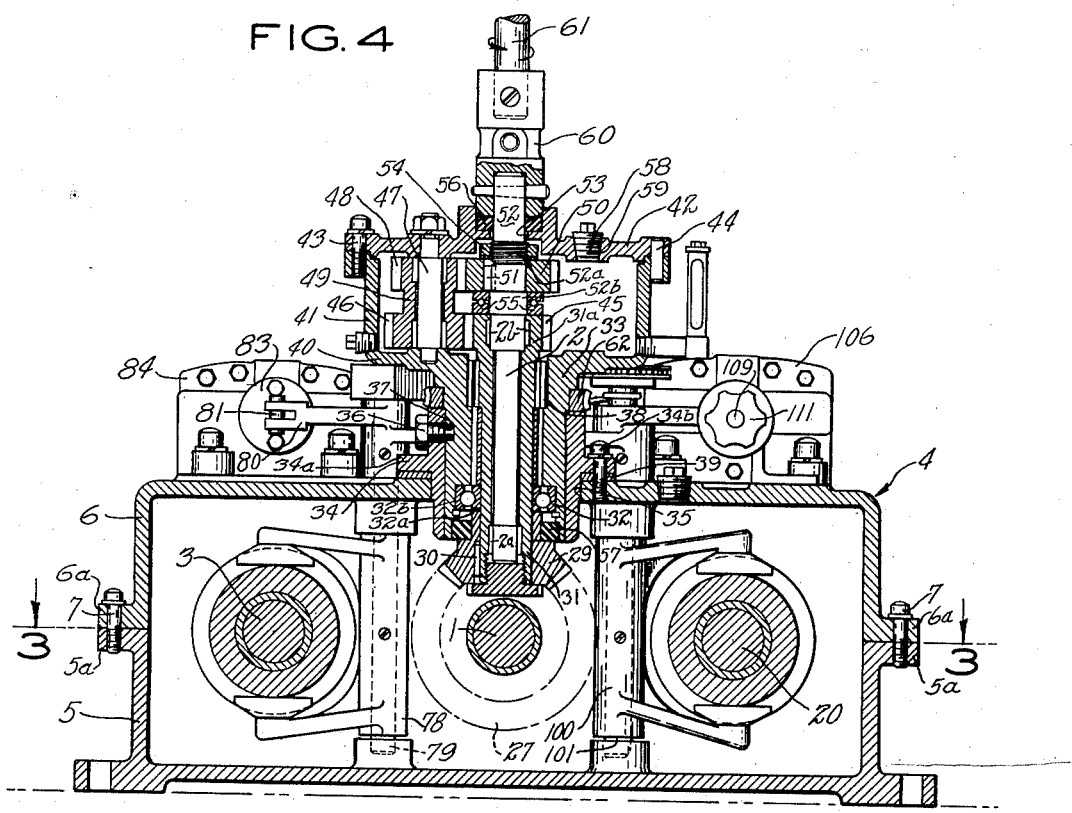
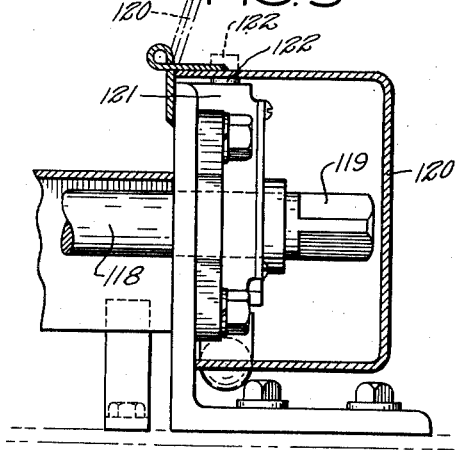
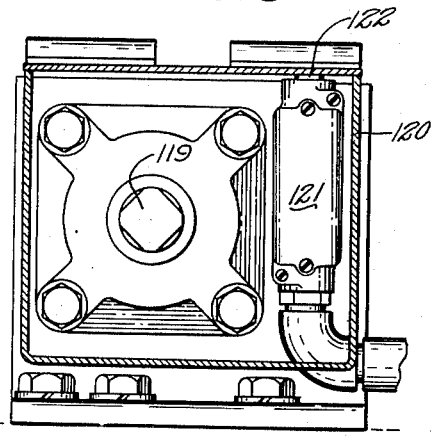
INVENTOR
BERNARD H. KOOB
BY Parham & Bates
ATTORNEYS

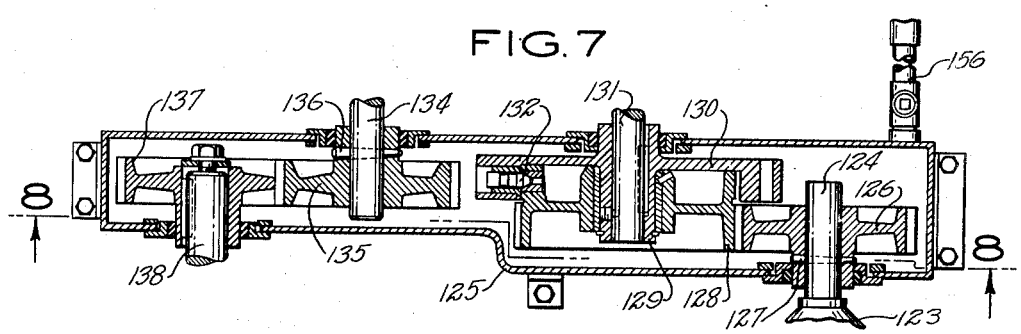
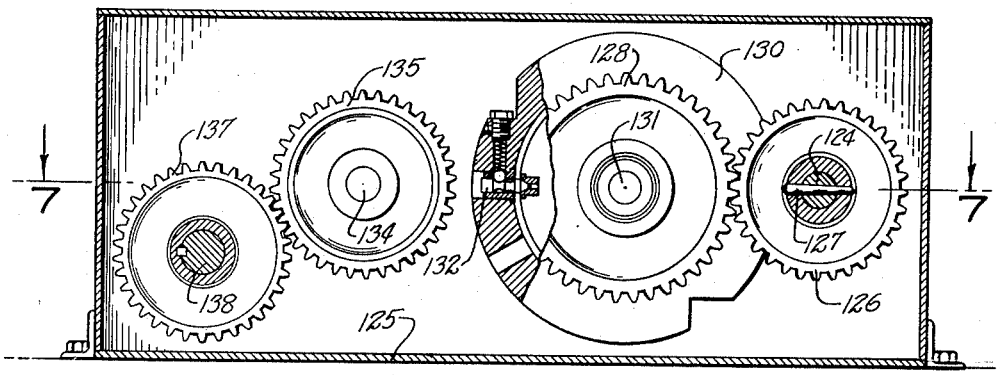
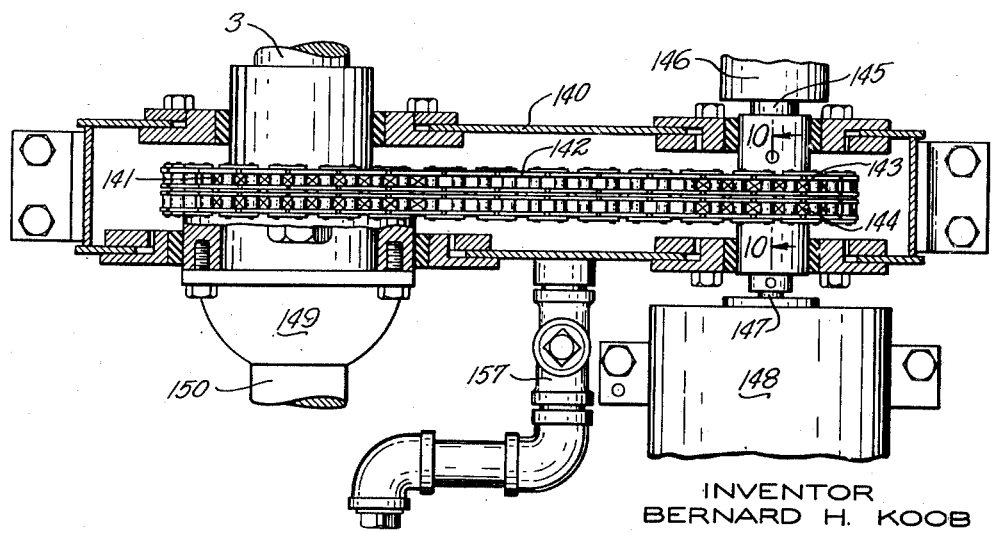

INVENTOR
BERNARD H. KOOB
BY Parham & Bates
ATTORNEYS

June 5, 1951  B. H. KOOB  2,555,448
SYNCHRONIZING DRIVE MECHANISM
Filed June 28, 1949  10 Sheets-Sheet 7

INVENTOR
BERNARD H. KOOB
By Parham + Bates
ATTORNEYS

June 5, 1951 B. H. KOOB 2,555,448
SYNCHRONIZING DRIVE MECHANISM
Filed June 28, 1949 10 Sheets-Sheet 8
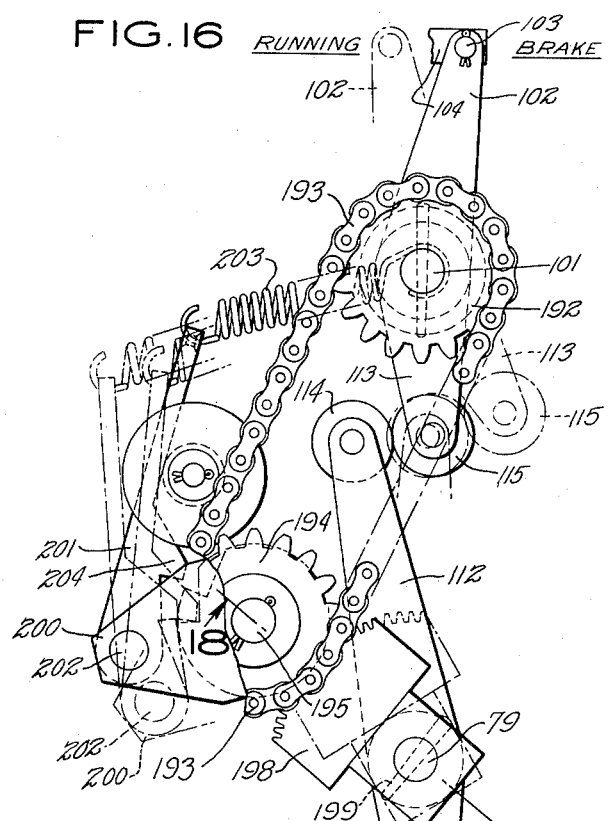
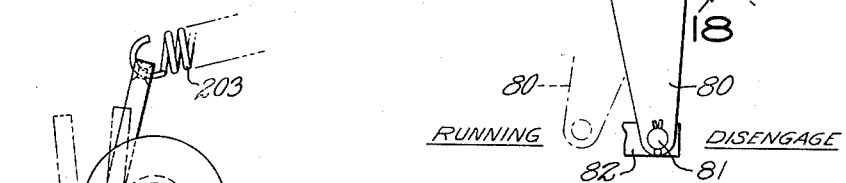
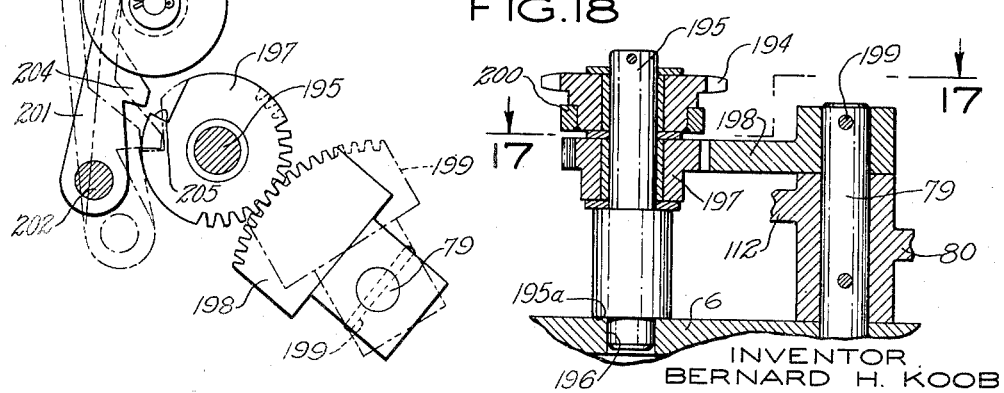
INVENTOR
BERNARD H. KOOB
BY Parham & Bates
ATTORNEYS

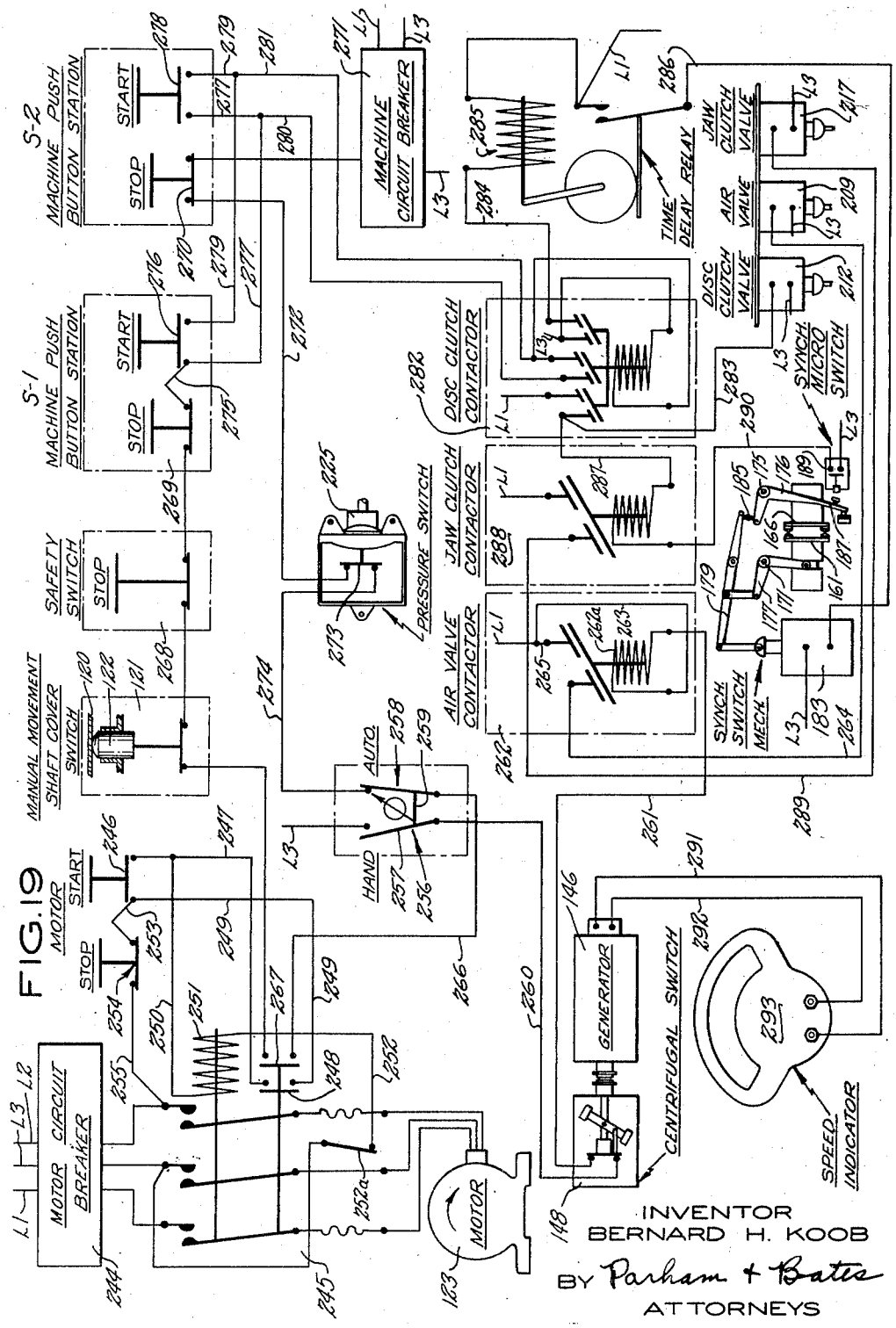

June 5, 1951

B. H. KOOB 2,555,448

SYNCHRONIZING DRIVE MECHANISM

Filed June 28, 1949

INVENTOR
BERNARD H. KOOB
BY Parham + Bates
ATTORNEYS

Patented June 5, 1951

2,555,448

UNITED STATES PATENT OFFICE 2,555,448

SYNCHRONIZING DRIVE MECHANISM

Bernard H. Koob, West Hartford, Conn., assignor to Emhart Manufacturing Company, a corporation of Delaware Application June 28, 1949, Serial No. 101,786

21 Claims. (Cl. 74—665)

This invention relates generally to improvements in synchronizing drive mechanisms and more particularly to a mechanism for driving and synchronizing or coordinating the operations of a glass charge feeder and an associate glassware forming machine.

An object of the invention is to provide a synchronizing drive mechanism having novel and efficient provisions to drive one machine, as a glass charge feeder, continuously at a predetermined regulable speed and a cooperative machine, as a glassware forming machine, at a speed suitably related to the speed of the first machine to synchronize or coordinate the operations of the two machines and so that the second machine may be stopped and started at will during continued operation of the first machine and automatically restored to synchronized or coordinated operating relationship therewith after each stoppage thereof without imposing any excessive or undue stress on any of its driving parts or connections.

A further object of the invention is to provide a synchronizing drive mechanism by which driving power may be transmitted from a prime mover to two cooperative machines, as to a glass charge feeder and an associate glassware forming machine, respectively, so that the glass feeder is operated at a predetermined adjustable speed and the forming machine, after each period of stoppage thereof, is brought into synchronism with the feeder in two stages, one of which involves driving the forming machine from a power input shaft through one set of motion transmitting connections at a speed slightly less than that desired while the second involves transfer of the driving load from the same power input shaft to a different set of motion transmitting connections and driving of the forming machine thereby at the relatively higher speed required to synchronize its operations with those of the feeder.

A further object of the invention is to provide an accurate and reliable automatically acting means to time the instant, after starting of the forming machine and in relation to the time of delivery of a charge by the feeder, at which the connections for driving the forming machine at the relatively higher speed required to synchronize its operations with those of the feeder are rendered effective to drive the forming machine at the relatively higher synchronizing speed.

A further object of the invention is the provision of effective electrical and mechanical interlocking arrangements to assure proper operations of the means to drive the forming machine at a relatively low starting speed and the means to drive the same machine at the higher synchronizing speed, respectively, and to prevent untimely or unintended operation of either.

A further object of the invention is to provide a synchronizing drive mechanism for a glassware feeder and an associate forming machine having adequate safety provisions to take care of any contingencies that are likely to arise in actual practice.

A further object of the invention is the provision of a synchronizing drive mechanism of the character described having most of the relatively moving parts thereof, particularly the co-engaging and contact ones, adequately encased so that they may run in oil.

A synchronizing drive mechanism of the invention in the form now preferred by me includes a power input shaft driven from a prime mover through an efficient speed reduction mechanism, having an overload release. A feeder drive shaft is driven from the power input shaft through meshed gears and differential and speed reduction units. A machine drive shaft may be started and driven by power transmitted thereto from the power input shaft through a suitable arrangement of clutches and a train of gears so as to turn at slightly less than the speed desired for coordinated operation with the feeder. Power then may be applied to the machine drive shaft from the power input shaft through another arrangement of meshed gears and a single jaw clutch to drive the machine drive shaft at a relatively increased or higher speed and so as to synchronize the operations of the machine with those of the feeder. A free wheeling clutch in the transmission between the power input shaft and the machine drive shaft for starting the latter and driving it at the lower speed permits easy and strain-free transfer of the driving load to the second transmission to drive the machine drive shaft at the higher speed when the driving part of the single jaw clutch, which is rotated at the higher speed, is thrown into engaged or active position. The first transmission for starting and driving the machine drive shaft at the lower speed includes a double throw, double friction clutch unit which is moved to an active or engaged running position for transmission of power from the power input shaft to the machine drive shaft and may be moved to another active or engaged braking position when desired to brake the machine to rest. This double throw clutch also may be moved to an intermediate, neutral position when certain conditions precedent have been satisfied to permit manual turning of the machine by a wrench applied to a manual movement shaft which is operatively connected to a shaft in the first transmission on which the double throw clutch is mounted. The machine must be at rest before such a wrench can be engaged with the manual movement shaft and the wrench must be disengaged and removed therefrom before the machine can be again started.

The drive mechanism may be started and stopped at will by push buttons, and safety features are incorporated therein to prevent untimely or inadvertent operating or other movements of movable parts thereof. The operation of the feeder is not dependent on the operation of the forming machine but the drive control mechanism may include means automatically to cause a charge delivery scoop or chute of the feeder to swing from its normal working position to a position to divert the charges produced by the feeder to a cullet receiver whenever the forming machine is stopped. Thereafter, the forming machine must again be started and be operating in synchronism with the feeder before the charge delivery scoop or chute can be returned to its normal working position and this only after an appropriate manual action.

The control mechanism may include air motors to operate the double throw friction clutch and the single jaw clutch. The double throw clutch has an intermediate neutral position to which it can be moved by a hand operated pusher but only when the air supplied to its operating air motor has been shut off through the operation of a solenoid valve controlled by a maintained contact electrical switch. This solenoid valve can only be energized to close after the machine has come to a halt and is stationary; if the maintained contact switch is shifted from "running" to "hand" position, the machine will automatically stop before this valve closes.

If the main air supply for the air operable components of the drive mechanism drops below a predetermined pressure sufficient to operate the clutch air motors, the forming machine will automatically stop through the operation of a pressure switch; thereafter it cannot be started until the air pressure returns to the proper operating pressure.

The manual movement shaft has a hinged cover over its exposed end to prevent application of a wrench thereto until such cover has been raised. When the cover is in its raised position, the machine cannot run, thus obviating the possibility of starting the machine before the wrench has been removed. The machine will automatically stop if the cover is raised while the machine is running.

Driving of the forming machine at the relatively higher operating speed is effected through the single jaw synchronizing clutch which cannot be thrown into operation until the machine has reached a speed only slightly below its operating speed. In starting the machine after it has been stopped while the power input shaft is still running, the drive is from the input shaft through a free wheeling clutch and a train of gears which drive the machine shaft at the relatively lower starting speed, as at $14/15$ the speed of the power input shaft, this when the latter is rotating 15 times for each delivery of a charge by the operatively connected feeder and for each presentation of a mold of the forming machine at a charge receiving or mold loading station. Thereafter and at a proper time in relation to a time of mold charge delivery and of presentation of a mold at the loading station, the driving load is transferred automatically to a second train of gears by which the machine shaft will be driven at the same speed as the power input shaft. The free wheeling clutch permits the required slippage for the safe and frictionless transfer of the driving load from the slower starting speed train of gears to the more rapid synchronizing speed drive.

The time at which the synchronizing speed jaw clutch of the relatively higher speed drive will be thrown into operation after starting of the machine shaft is controlled by an automatically acting synchronizing switch mechanism so that the forming machine will be restored to its former phase relation to the feeder when it also is restored to speed synchronism therewith.

The foregoing and other features of the invention and some of the advantages thereof will hereinafter be pointed out or will become apparent from the following description of the aforesaid practical embodiment of the invention as shown in the accompanying drawings, in which:

Fig. 4 is a transverse vertical section through the gear and clutch box approximately along the line 4—4 of Fig. 3;

Fig. 5 is a fragmentary vertical section through a hinged safety cover for a manually turnable shaft of the drive mechanism, the raised position of such cover being indicated by dot-and-dash lines;

Fig. 6 is an end view of the safety cover mechanism of Fig. 5;

Fig. 7 is a horizontal sectional view through an encased speed reduction and overload release unit which is included in the power transmission between a motor of the drive and a power input shaft in the gear and clutch box, the view being along the line 7—7 of Fig. 8;

Fig. 8 is a horizontal section through the same speed reduction unit along the line 8—8 of Fig. 7;

Fig. 9 is a fragmentary plan sectional view of an encased sprocket-and-chain assembly and connected parts at one side of the gear and clutch box;

Fig. 16 is a plan view of mechanical interlocking means between the mechanisms for operating the starting speed disc clutch and the synchronizing speed jaw clutch, showing inactive or disengaged positions in full lines and indicating running positions by dot-and-dash lines;

Fig. 17 is a view, mainly in plan of some of the elements of the mechanism shown in Fig. 16, the view being approximately along the line 17—17 of Fig. 18;

Fig. 18 is a fragmentary vertical section along the line 18—18 of Fig. 16;

Fig. 19 is a diagram of electrical connections and mechanisms of the control mechanism; and Fig. 20 is a diagram of the pneumatic devices and connections of the control mechanism.

Figure 1:
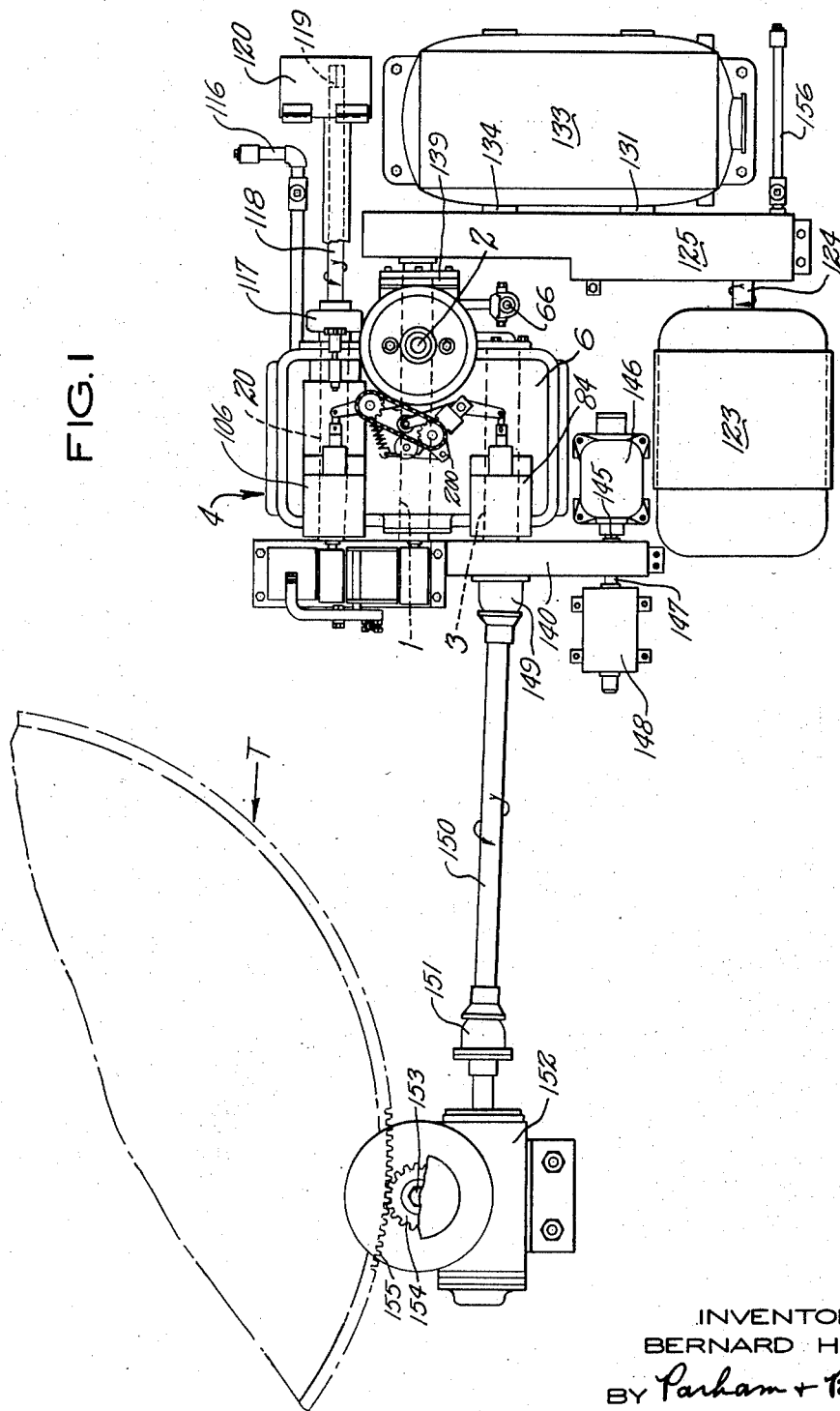
Fig. 1 is a more-or-less diagrammatic plan view of the synchronizing drive mechanism operatively applied to the rotary turret of a forming machine, a fragmentary portion of which is shown by dot-and-dash lines, and to a feeder drive shaft.
Figure 2:
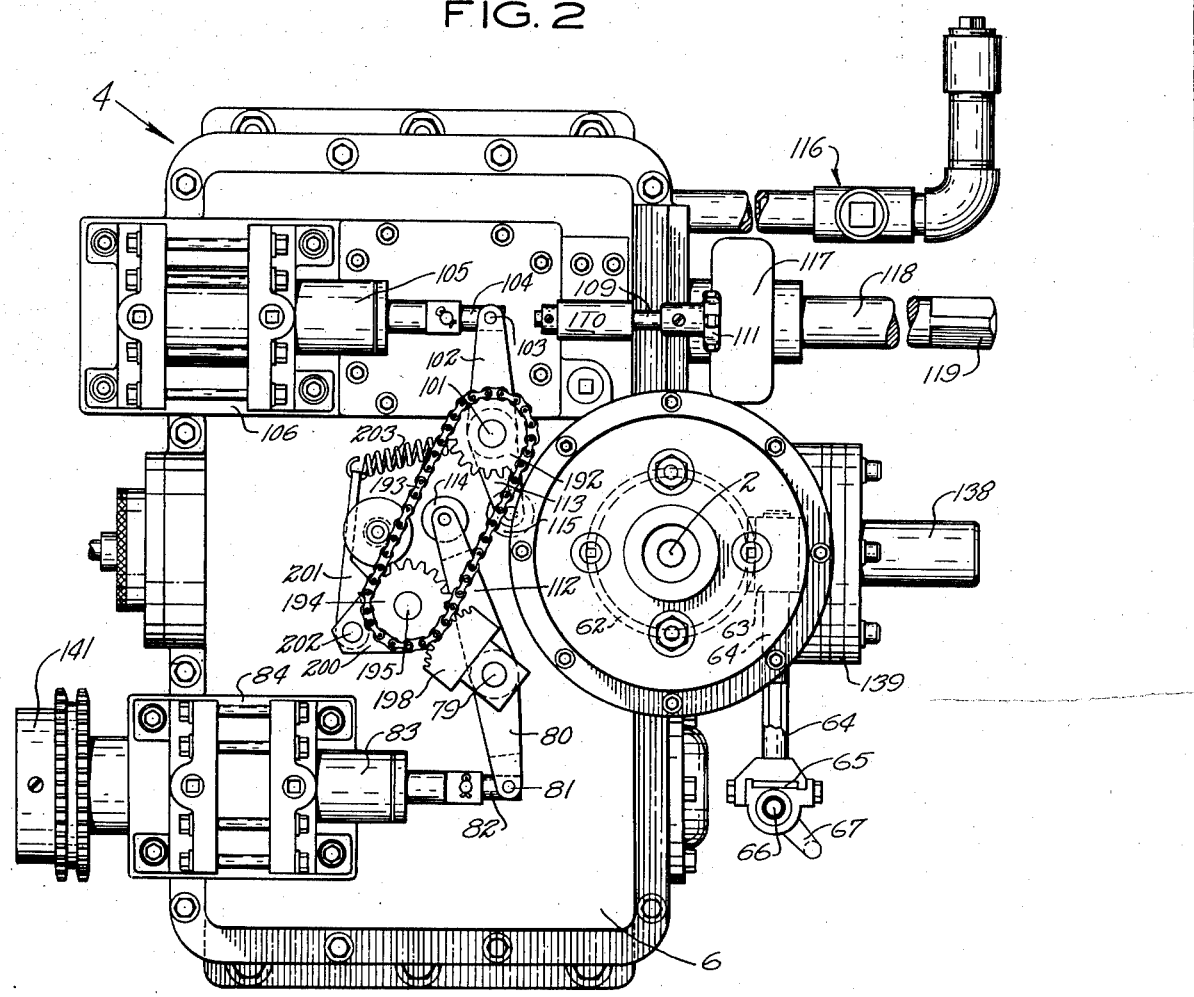
Fig. 2 is a plan view of a gear and clutch box of the drive mechanism.
Figure 3:
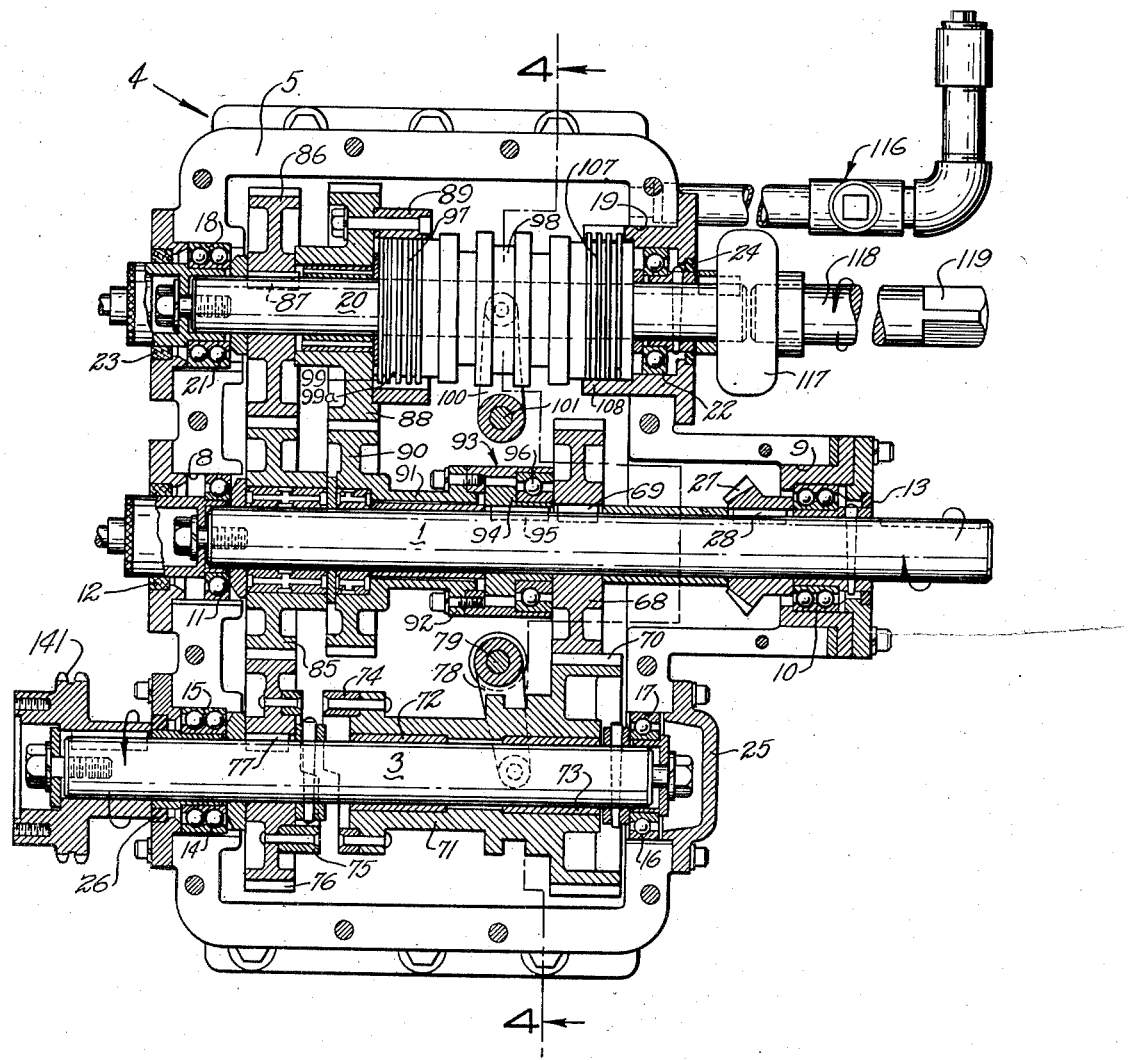
Fig. 3 is a plan sectional view of the interior and contents of the gear and clutch box with the cover or upper section thereof removed, the view being approximately along the line 3—3 of Fig. 4.

In the embodiment of the invention shown in the drawings, the drive mechanism comprises a power input shaft 1, Figs. 1, 3 and 4, and two power output shafts, respectively designated 2, Figs. 1, 2 and 4, and 3, Figs. 1, 3 and 4. The output shaft 2 may be termed a feeder drive shaft and the output shaft 3 a machine drive shaft since these shafts, in an application of the invention for which it is particularly designed, drive a glass charge feeder (not shown) and a glassware forming machine having a rotary turret, a fragmentary portion of which is indicated by dot-and-dash lines at T in Fig. 1.

The shafts 1, 2 and 3 together with suitable motion transmitting elements and associate parts are arranged in a unit which may be termed a gear and clutch transmission and which is indicated generally at 4 in Figs. 1 to 4, inclusive. The unit 4 comprises a gear-and-clutch housing comprising a hollow, substantially rectangular lower section 5, Figs. 3 and 4, and a hollow, complementary top section 6, Figs. 1, 2 and 4. These housing sections may have flanged abutting edge portions 5a and 6a, respectively, rigidly fastened together, as by cap screws 7, Fig. 4. The opposite side walls of the housing are formed intermediately to provide aligned openings designated 8 and 9, respectively, as is clear from Fig. 3. The power input shaft 1 extends through an antifriction bearing unit 10 which fits in the opening 9. At the opposite side of the housing 5, 6, the shaft 1 is journaled in an antifriction bearing unit 11 which fits in the opening 8. Sealing means may be provided around the shaft 1 at the outer end of the opening 8 as indicated at 12. Sealing means also may be provided around the shaft 1 at the outer end of the opening 9 as indicated at 13.

The power output shaft 3 extends through and is mounted in an antifriction bearing unit 14 which fits in an opening 15 in the same side wall of the housing as that provided with the opening 8. The inner end of the output shaft 3 is journaled in an antifriction bearing unit 16 which fits in an opening 17 in the same side of the housing as that in which the opening 9 is provided and laterally of the latter, the openings 15 and 17 being aligned. By this arrangement, the shaft 3 is spaced from the shaft 1 and is parallel therewith. In the arrangement shown, these shafts are at substantially the same level although this is not essential.

The housing 5, 6 also is provided with aligned openings 18 and 19, respectively, in its side walls. A countershaft 20 which may be termed a "starting speed shaft" has a portion journaled in an antifriction bearing unit 21 which fits in the opening 18, which is in the same side wall of the housing as the openings 8 and 15. This shaft 20 also extends through and is mounted in an antifriction unit 22 mounted in the opening 19. Sealing means as at 23 may be provided around the shaft 20 at the outer end of the opening 18 and as at 24 at the outer end of the opening 19. The shaft 20 is disposed parallel with the input shaft 1 and with the output shaft 3 and at the same level. A cover as indicated at 25 may be fastened to the housing over the end of the shaft 3 at the opening 17. Sealing means 26 may be provided around the shaft 3 at the opening 15.

The shaft 1, within the housing 5, 6, carries a bevel gear 27, Figs. 3 and 4, fastened thereto, as by a key 28, and in mesh with a bevel gear 29, Fig. 4, which is fastened at 30 on a tubular shaft 31 in which the output shaft 2 is journaled, as at 2a and 2b, respectively. The tubular shaft 31 extends through an antifriction bearing unit 32 having an inner member 32a fast on the tubular shaft and an outer member 32b fast in a tubular part 33 which rotatably interfits an externally flanged annular mounting member 34. The latter depends through and has a portion tightly fitting in an opening 35 in the top of the housing part 6. The mounting member 34 may carry a removable pin 36 projecting into an annular groove 37 in the tubular part 33 to prevent unintended upward displacement of the part 33 in the mounting member. The members 31 and 33 are of substantial length and needle bearings, indicated at 38, may be provided between their upper portions to supplement the parts of the antifriction bearing 32 between their lower portions so that antifrictional relative turning movements thereof may be effected. One or more shims, such as that indicated at 39, may be provided between an outwardly extending supporting flange portion 34a of the flanged mounting part 34 and the underlying portion of the top of the housing part 6 around the opening 35 to position the bevel gear 29 at the level appropriate for meshed engagement with the bevel gear 27. The flange 34a may be securely fastened to the top of the housing part 6 by suitable fastening means 34b.

The tubular member 33 may constitute a downward prolongation of a bottom 40 of a gear box 41 having a cover 42 fastened thereon, as by cap bolts 43 and dowels 44. The tubular shaft 31 projects upwardly into this gear box, as indicated at 31a, its projecting upper end portion carrying a spur gear 45 is in mesh with a larger spur gear 46 which is loose on a vertical, relatively short countershaft 47 in the gear box 41—42. The spur gear 46 is rigid with a smaller spur gear 48 which also is loose on the shaft 47 and is disposed above the spur gear 46. In the example shown, the gears 46 and 48 are integral lower and upper portions, respectively, of a vertically disposed tubular member 49 loose on the shaft 47. The gear 48 is in mesh with a larger spur gear 50 which is keyed at 51 to a stepped intermediate portion 52 of the output shaft 2, the upper end portion of which projects through an opening 53 in the cover 42 of the gear box 41—42. A jam nut 54 may be provided on a threaded portion 52a of the shaft 2 above the gear 50 and an antifriction thrust bearing unit 55 may be provided on a slightly enlarged portion 52b of the shaft 2 between the upper end of the tubular shaft 31 and the gear 50. A packing ring 56 may be provided around the shaft 2 above the opening 53 in the gear box cover 42. A cooperative packing ring 57 may be provided around the bevel gear 29 within the lower part of the vertical tubular member 33 so that all the parts within the gear box 41—42 and in the tubular member 33 depending therefrom may run in oil which may be put into the gear box through a fill opening 58 in its cover, this fill opening normally being closed by a removable plug 59.

The output shaft 2 may be fastened by a universal joint 60 to a shaft 61 which may lead to and be operatively connected to the machine to be driven. As aforesaid, this may be a glass charge feeder (not shown).

A worm gear 62 is fast on the tubular bottom dependency 33 of the gear box 41—42. As shown in Fig. 2, a worm 63 is in mesh with the gear 62 and is carried by a shaft 64 fastened by a universal joint 65 to a shaft 66 which may be turned by a handle 67. By this arrangement, the gear box 41—42, including the planetary gears 46 and 48, may be angularly adjusted around the axis of the power output shaft 2 to effect a phase adjustment between the cycles of this power output shaft and those of the tubular shaft 31 which is driven from the power input shaft 1 through the meshed bevel gears 27 and 29 and rotates in unison therewith.

It thus is apparent that so long as the power input shaft 1 is operating, motion will be imparted to the power output shaft 2 for operating a machine, as the charge feeder, and that the speed at which the shaft 2 is driven will be relatively reduced from that of the power input shaft 1, this because of the speed reduction gearing constituting the described motion transmitting connections between these shafts. The extent of this reduction may of course be predetermined and maintained by appropriate selection of the cooperative gears of this transmission. The drive shaft of the feeder thus may be caused to rotate a predetermined less number of times than the power input shaft, as, for example, to make 10 revolutions for every 15 revolutions of the input shaft. As hereinafter will be explained, the driving connections between the input shaft and the machine drive shaft 3 may be such as to drive the machine shaft at a speed appropriately related to the operation of the feeder and such as to synchronize the operations of the feeder and the forming machine, respectively.

The means for operating the power output shaft 3 from the input shaft 1 will now be described. As best seen in Fig. 3, a spur gear 68 is keyed at 69 on the power input shaft 1 within the housing 5, 6 and is in mesh with a spur gear 70 which forms one end portion of a sleeve 71 which is rotatably and slideably mounted on the shaft 3. As shown, bearing bushings 72 and 73, respectively, are provided in the end portions of the sleeve 71 around the shaft 3. The gear 70 is sufficiently longer than the gear 68 to remain in mesh therewith at all longitudinally different positions of the sleeve 71 on the shaft 3. The ratio of the gears 68 and 70 is 1 to 1 in the example shown so that the sleeve 71 will be rotated at the same speed as the power input shaft. The end of the sleeve 71 opposite the gear 70 carries a single jaw driving clutch member 74, adapted, when engaged with a cooperative single jaw clutch member 75, on a gear 76 which is keyed at 77 to the shaft 3 to drive the gear 76 and hence the shaft 3 at the same speed as the power input shaft 1. For shifting the sleeve 71 between its idle, disengaged position, as shown in Fig. 3 and its active, engaged position with its driving single jaw clutch member in driving relation to the single jaw clutch member on the gear 76, a horizontally rockable, forked clutch shifter 78 may be employed, this clutch shifter being best seen in Fig. 4 and being mounted on a vertically disposed rock shaft 79 which projects above the top of the upper portion 6 of the housing 5, 6. It there carries a rocker arm 80 operatively connected at 81 (see also Fig. 2), to the outer end 82 of a piston rod 83 projecting from an air motor 84 on the top of the housing 5, 6. As hereinafter will be explained, the single jaw driving clutch member 74 is not thrown in until the shaft 3 has already been started and is being rotated at a speed just slightly less than its operating speed through the operation of gearing and clutch means on the starting speed countershaft 20.

As best seen in Fig. 3, the gear 76 on the power output shaft 3 is in mesh with a gear 85 which is loose on the shaft 1 and is in mesh with a gear 86 which is keyed at 87 on the countershaft 20. The ratio of any two of these three gears 76, 85 and 86 is 1 to 1. A further gear, designated 88, is loose on the shaft 20 adjacent to the gear 86 and carries a driven clutch member 89. The gear 88 is in mesh with a gear 90 which is formed as an end portion of a sleeve 91 that is loose on the power input shaft 1. The end portion of the sleeve 91 opposite the gear 90 carries an outer member, indicated at 92, of a free wheeling clutch unit, generally designated 93, which includes an inner member, designated 94, keyed at 95 to the power input shaft 1. An antifriction unit, indicated at 96, may be located between the outer and inner members of this free wheeling clutch. The arrangement is such that the shaft 1 will act through the free wheeling clutch 93 to turn the gear 90 when the shaft 1 is rotating and the gear 88 which is loose on the shaft 20 will, of course, be turned by the gear 90. The ratio of the gear 90 to the gear 88 is such that the gear 88 will be turned at a predetermined less speed than the power input shaft 1, as at 14/15 of the speed of the latter. When the gear 88 is connected with the shaft 20, as may be effected by means to be described, the turning of the shaft 20 at the relatively lower speed than the power input shaft will be attended by driving of the power output shaft 3 at this relatively lower speed, this as a result of the provision of the gears 86, 85 and 76. As previously stated, the gear 88 carries a driven clutch member 89. A friction driving clutch assembly 97 of discs 99 and 99a cooperative therewith is actuable by one end of a longitudinally shiftable sleeve 98 mounted on the countershaft 20. Shifting of the sleeve 98 to engage the clutch assembly 97 with the driven clutch member 89 may be effected by a rockable clutch shifter 100 on a vertical rock shaft 101. As best seen in Fig. 4, this rock shaft 101 projects above the top of the housing 5, 6 and carries a rocker arm 102 (also Fig. 2) which is operatively connected at 103 to the outer end portion 104 of a piston rod 105, projecting from an air motor 106 on the top of the housing. The sleeve 98 has its end opposite the clutch assembly 97 formed to provide a second friction clutch assembly, designated 107, which is adapted to engage with a stationary braking ring 108, surrounding the portion of the shaft 20 in the antifriction bearing 22 so as to brake the shaft 20 and therefore the power output shaft 3 to a stop when the clutch sleeve 98 has been shifted to the limit of its stroke away from the clutch member 89 to engage the clutch member 107 with the braking ring 108. The parts 97, 98 and 107 thus constitute what might be termed a double throw, duplex clutch unit. This is the starting speed and braking clutch as hereinafter will be further explained. The clutch unit may occupy an intermediate position, substantially as shown in Fig. 3, at which the clutch member 97 is disengaged from its cooperative clutch member 89 and the clutch member 107 is disengaged from its braking ring 108 but this neutral position can be attained only after the machine has been stopped and certain other essential conditions have been fulfilled. To move the clutch unit from its braking position to its neutral position when required, a push rod 109 is provided on the top of the housing 5, 6 in a fixed guide sleeve 110 through which it may be pushed manually by pressure on a handle 111 until its free end bears against the end 104 of piston rod 105 for operating the clutch sleeve 98 and pushes the latter toward the air motor until the clutch is in its neutral position. It may be noted at this time that the rock shafts 79 and 101 carry rigid projecting arms 112 and 113, respectively, on their upper end portions relatively positioned so that the arm 113 will obstruct movement of the arm 112 to prevent throwing in of the single jaw driving clutch member 74 until after the friction clutch assembly 97 has been thrown into engagement with the cooperative clutch member 89. Rollers indicated at 114 and 115, respectively, may be provided on the interfering free ends of the arms 112 and 113.

When the clutch sleeve 98 is in its neutral position, the roller 115 will be in the position shown in Fig. 2. Movement of the clutch sleeve 98 to the left in Fig. 3 to engage the clutch assembly 97 with the driven clutch member 89 will move the roller 115 to the dotted line position of Fig. 16. This will permit movement of the roller 114 from its full line positon, Figs. 2 and 16, which it occupies when the single jaw clutch member 74 is in its idle, disengaged position, to the dotted line position, Fig. 16, to which it will be moved when the single jaw clutch 74 has been shifted to the left in Fig. 3 to its active or running position in engagement with the cooperative driven clutch member 75. This arrangement effectually prevents untimely throwing in of the single jaw clutch as the friction clutch 97 must first have been thrown in. In consequence, the transfer of the driving load to the single jaw clutch will be effected without strain on any of the power connections and the output shaft 3 thereafter will be driven at the same speed as the power input shaft 1, which has been predetermined to be appropriate to synchronize the operations of the machine driven from the shaft 3 with those of the feeder driven from the shaft 2. The free wheeling clutch 93 permits the driving power to be thus transferred. A safety interlock linkage system, hereinafter described, assures disengagement of the jaw clutch if the disc clutch is disengaged and prevents independent disengagement of the jaw clutch.

The parts within the housing 5, 6 may be bathed in oil, the housing being provided with a combination oil fill and drain pipe means indicated at 116 in Figs. 2 and 3.

The countershaft 20 is connected outside of the housing 5, 6 by a coupling 117, Figs. 1, 2 and 3, to a manual movement shaft 118, the outer end portion of which is squared at 119, Figs. 1, 2, 3, 5 and 6, so that it may be engaged by a wrench which can be manipulated to turn the shaft 20 by hand and thence through the train of intervening gears, the power output shaft 3 and the machine operated therefrom. This operation will of course be possible only when the output shaft 3 is not being operated by power. In order to prevent premature application of power after a wrench has been applied to the end 119 of the manual movement shaft and to prevent any attempt at manual operation of the output shaft 3 while the power means is effective to transmit power thereto, a hinged cover 120 is provided for the wrench-engageable squared end 119 of the manual movement shaft and a micro-switch 121 is provided within the confines of the cover 120 so as to be maintained closed by the pressure of a portion of the cover against its push button control element, indicated at 122, when the cover 120 is closed. Raising of the cover 120, as to the dot-and-dash line position shown in Fig. 5, will permit the push button control element 122 to rise so as to open the micro-switch 121. The micro-switch 121 is operatively connected, as hereinafter will be pointed out, to an electrical control mechanism of the drive so as to stop the power means automatically when the cover 120 is raised. As also will be apparent, the cover 120 must be lowered to its closed position over the end 119 of the shaft to close the micro-switch 121 and this involves disengagement and removal of any wrench that has been used to turn the manual movement shaft before the cover can be closed.

The power input shaft 1 may be driven from a suitable prime mover, indicated as a motor 123, Fig. 1, through connecting motion transmitting means suitable to permit accurate predetermination and regulable control of the speed of rotation of such power input shaft. In the example shown, the motor 123 has a drive shaft 124 projecting into a casing 125, Figs. 1 and 7, and carrying a gear 126 within such casing, Fig. 7, the gear being fastened thereto, as by a pin 127. The gear 126 is in mesh with a larger gear 128 (see Fig. 8 also) which is loose on the hub 129 of an overload release clutch wheel 130 keyed to a countershaft 131. The overload releasing connection between the clutch wheel 130 and the gear 128 is of a conventional type, as indicated at 132 in Figs. 7 and 8 and functions in a conventional manner. The countershaft 131 projects into a speed changing unit 133, Fig. 1, which may be of any suitable known or preferred structure and mode of operation and therefore is shown only diagrammatically. This unit 133 has a final motion or drive shaft 134 projecting into the casing 125, Fig. 7, and there carrying a gear 135, pinned thereto at 136. The gear 135 is in mesh with a gear 137 (see Fig. 8 also), keyed to a shaft 138 which projects from the casing 125 and is connected by a suitable coupling, indicated at 139 in Fig. 1, to the power input shaft 1 with which it is aligned. The gears 135 and 137 may be of the same size.

Figure 10:
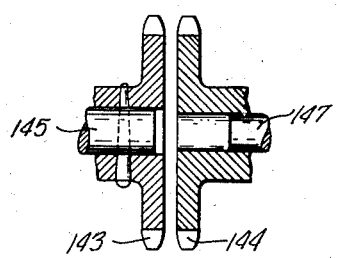
Fig. 10 is a section along the line 10—10 of Fig. 9.
Figure 15:
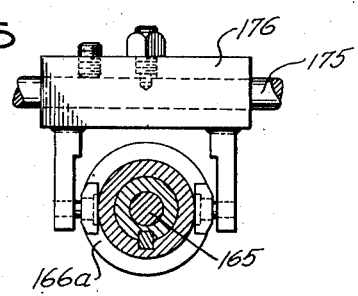
Fig. 15 is a relatively reduced section substantially along the line 15—15 of Fig. 14, showing a cam disc shifter.

The power output shaft 3 may be operatively connected to the machine to be driven therefrom by suitable connecting means. As shown in Figs. 1 and 9, this shaft projects into a casing 140 where it carries a double sprocket 141, Fig. 9. A double chain 142 is trained about this sprocket within the casing 140 so that one of the double components thereof is trained about a sprocket 143 while the other of the double components of the chain is trained about an adjacent aligned sprocket 144. See also Fig. 10. The sprocket 143 is on a shaft 145 which projects from the casing 140 and drives a magneto generator 146. See Fig. 1. The sprocket 144 is on a shaft 147 which similarly drives a centrifugal switch 148.

The power output shaft 3 is connected operatively at the opposite side of the casing 140, as by a suitable universal coupling 149, Fig. 1, with a shaft 150 which constitutes an extension of shaft 3 and is connected by a universal coupling 151 with a speed change mechanism 152. The latter has a driven shaft 153 carrying a pinion 154 in driving engagement with an outer ring gear 155 on the machine turret T.

The casing 125 may be provided with a combination oil fill and drain pipe means 156, Fig. 7. The casing 140 similarly may be provided with a combination oil fill and drain pipe means 157. The moving parts within these casings thus may run bathed in oil.

The synchronizing switch controlling the operation of throwing in the synchronizing speed jaw clutch will now be described, particularly with reference to Figs. 11 to 15, inclusive.

Figure 11:
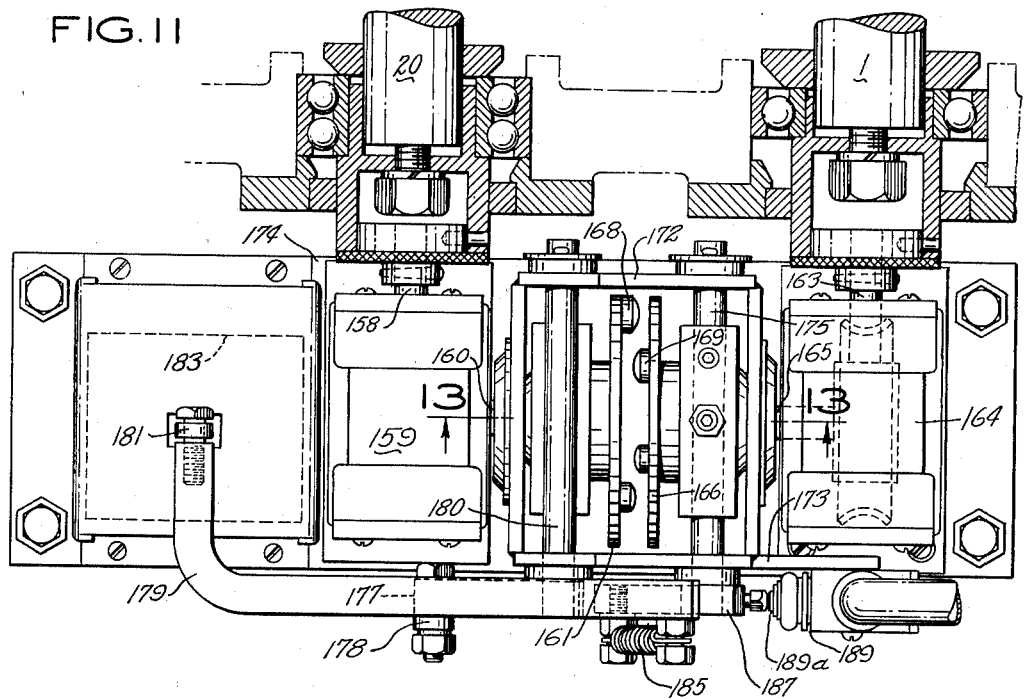
Fig. 11 is a view mainly in plan and partly in horizontal section of the automatic synchronizing switch mechanism for throwing the synchronizing speed jaw clutch into operation at the proper time.
Figure 13:
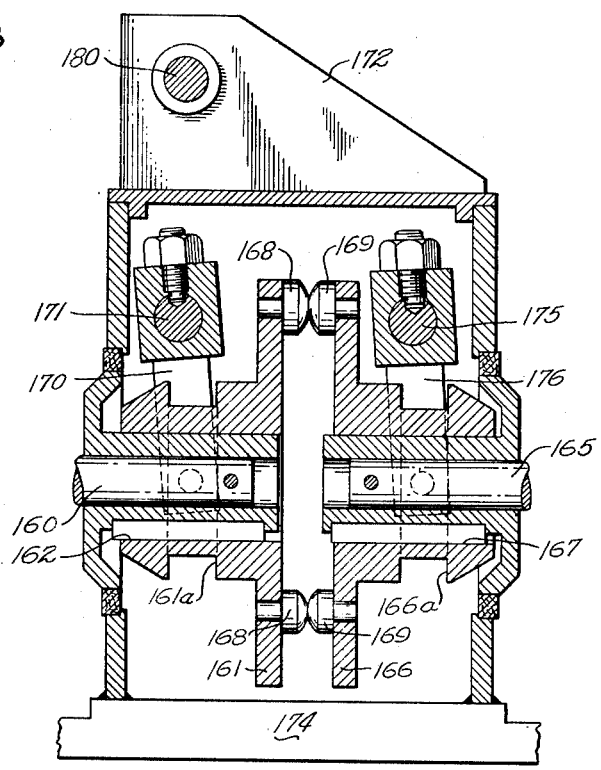
Fig. 13 is a relatively enlarged vertical section through timing cam discs of the switch mechanism as viewed from approximately the line 13—13 of Fig. 11 but showing these discs cammed apart from the relative positions which they occupy in Fig. 11.
Figure 14:
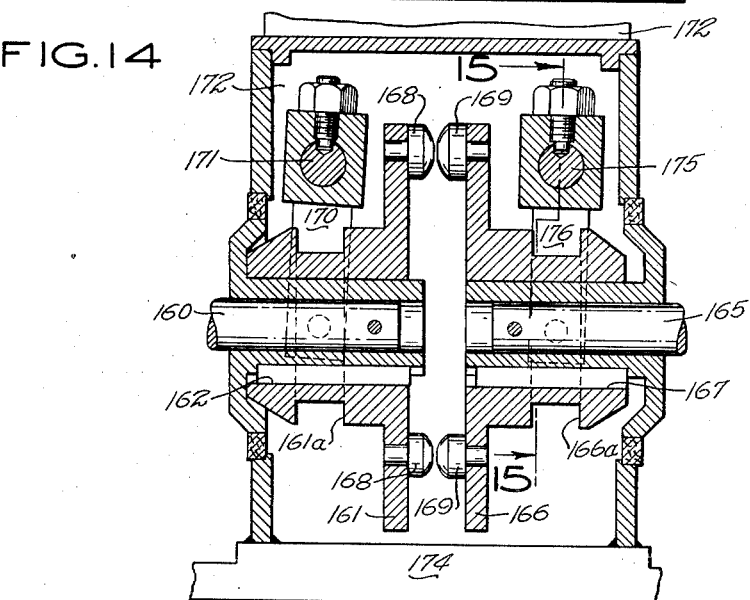
Fig. 14 is a view like Fig. 13 but showing the cam discs spaced apart preliminary to an operation thereof to effect throwing in of the jaw clutch.

The starting speed shaft 20, Fig. 11, has an outboard end extension 158 operatively connected by a speed reduction unit 159 to a short, rightly-angularly turned shaft 160, Figs. 11, 13 and 14, for rotating a disc 161 slidably mounted on the shaft, as indicated at 162, Figs. 13 and 14. The power input shaft 1 has a similar end extension, 163, which is operatively connected through a speed reduction unit 164 to a laterally turned, short shaft 165 on which a similar, confronting disc 166 is similarly mounted as indicated at 167, Figs. 13 and 14. The discs are provided on their adjacent faces with projecting cam elements in the form of rounded cam buttons 168 and 169, respectively, there being two diametrically opposite such buttons on each cam disc. When the cam discs are at the limits of their axial movements away from each other, as shown in Fig. 14, the buttons will clear each other on relative rotation of the cam discs. However, when the cam discs are at the limits of their axial movements toward each other, as shown in Fig. 11, the space between them is less than twice the extent of projection of the cam buttons on either of the discs.

The speed reduction units 159 and 164 effect like reductions of speed of the discs in relation to the machine starting shaft 20 and the power input shaft 1, respectively. Thus, if the power input shaft 1 is being rotated 15 times each time a mold charge is produced by the driven feeder and delivered to a mold of the driven forming machine at a loading station when the feeder and forming machines are being operated in synchronized or coordinated relation to each other, then the reduction of the speed of the disc 166 which is driven by the power input shaft is 15 to 1 so that this disc makes but one complete revolution in the time referred to. The reduction of speed of the more slowly rotating disc 161 which is driven by the starting speed shaft 20 is the same so that during this same time interval the disc 161 will make only 14/15 of a complete revolution. This time interval may be otherwise described as the time between successive charge severing operations of the feeder shears and between the presentation of successive molds of the forming machine at the loading station.

The disc 161 driven by the machine starting shaft 20 may be moved axially on its shaft 160 by a pivoted shifter fork 170 carried by a transverse rock shaft 171 which is journaled adjacent its ends in suitable parallel vertically edgewise supporting plates 172 and 173 on a suitably supported base 174 so that the shaft 171 is located above and extends in a direction at a right angle with the direction of the shaft 160. The fork 170 engages a peripherally grooved hub portion 161a of the disc 161 in a conventional manner. A similarly mounted rock shaft 175 carries a shifter fork 176 engaged with a peripherally grooved hub portion 166a of the disc 166. See Fig. 15. The rock shaft 171 carries a rocker arm 177, Figs. 11 and 12, connected by a link 178 to one arm of a lever 179 which is fulcrumed between its ends on a transverse shaft 180, Fig. 11, carried by the upper portions of the supporting plates 172 and 173 above the level of the transverse shafts 171 and 175. See Fig. 12. The lever 179 is operatively connected by a link 181 at the end of the arm to which the link 178 is attached to an armature 182 of a solenoid 183. The opposite end of the lever is connected at 184 to one end of a tension coil spring 185, the opposite end of which is connected to the free end of a rocker arm 186 on the rock shaft 175. This rock shaft, as aforesaid, is for operating the shifter for rotating disc 166. Such rock shaft also carries a rigid arm 187 which is provided near its extremity with an adjustable actuator 188, in the form of a projecting threaded screw having its end operatively positioned in relation to a projecting stem 189a of a normally open micro-switch 189. An adjustable stop element 190 on the arm 187 is adapted to engage a fixed stop 191 on the supporting plate 173 to limit swinging movement of the arm 187 away from the micro-switch 189.

Figure 12:
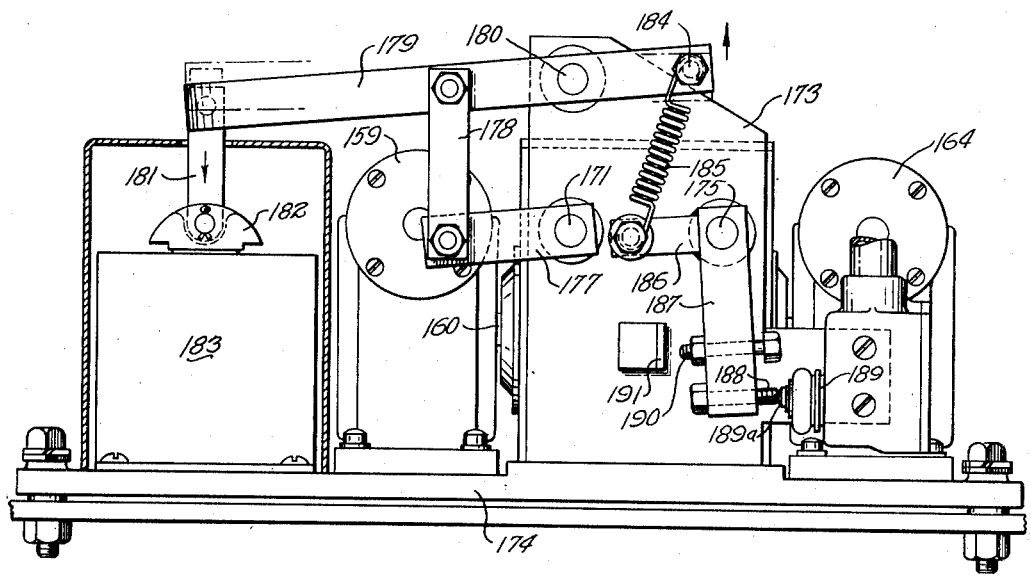
Fig. 12 is an elevation of the synchronizing switch mechanism, with a casing of a solenoid included therein shown in transverse vertical section.

When the solenoid 183 has been energized, as presently will be explained, the lever 179 will be pulled to its full line position as shown in Fig. 12 against the action of the spring 185. This will rock the shaft 171 counter-clockwise to the position shown in Fig. 12 with concurrent shifting of the disc 161 from the position shown in Fig. 14 to the position shown in both Figs. 11 and 13. The spring 185 tends to act through the arm 186 on the rock shaft 175 to rock it clockwise from the position shown in Figs. 12 and 14 until stop 190 strikes fixed stop 191. This will permit opening of the switch 189 and will slide disc 166 to the position shown in Fig. 11. As hereinafter will appear, energization of the solenoid is effected through a suitably connected time delay relay automatically when manual action is taken to cause operation of the starting speed shaft 20. The disc 161 therefore is turning at 14/15 the speed of the disc 166 when the discs have been moved to their relatively closest positions as shown in Fig. 11. When the buttons on the faster turning disc 166 catch up with the buttons on the slower disc 161, they will tend to ride over the latter and this will cause shifting of the disc 166 away from the other, thereby turning the rocker arm 187 so that the actuator thereon is moved into actuating contact with the stem or switch closing element 189a of the switch 189. Closing of this micro-switch will be effective through connected elements of the presently described control mechanism to admit air to the cylinder 84 by which the synchronizing speed jaw clutch is thrown into operation.

The operating mechanisms for the clutches are electrically controlled so that both the disc and the jaw clutch will be instantly shifted out of driving engagement when the machine is stopped by one of the various means provided for that purpose. The disc clutch, as operated by the air cylinder 106, is shifted from engaged fully to braking position. As a safety measure, there is also a mechanical interlock between the shift levers of the disc and jaw clutches. This mechanical interlock acts in such a manner that if the disc clutch is disengaged from its position to start operation of the machine, then the jaw clutch must also positively be disengaged. The safety interlock linkage further makes it impossible for the jaw clutch to be disengaged independently of disengagement of the disc clutch when driving is being effected at synchronized speed. This mechanical interlock will now be described.

As shown in Figs. 2 and 16, the vertical rock shaft 101 for the disc clutch has a sprocket 192 pinned to its upper end. A chain 193 is trained around this sprocket and about a sprocket 194 which is free on the upper end of a short vertical shaft 195 which is supported at its lower portion at 195a in a suitable opening 196 in the top of the housing 6 in a position adjacent to the vertical rock shaft 79 for the jaw clutch and at one side of a line between the vertical rock shafts 101 and 79. See Fig. 18 also. A spur gear segment 197 on the shaft 195 beneath the sprocket 194 is in mesh with a gear sector 198 which is pinned at 199 to the upper end of the rock shaft 79. The sprocket 194 is provided with a rigid projecting arm 200 to which a horizontal latching arm 201 is pivoted at one end at 202, the other end of this latching arm being connected by a tension coil spring 203 to the vertical rock shaft 101. A detent 204 on the latching arm 201 is adapted to enter a notch 205 in the periphery of the gear 197 on the intermediate shaft 195 when the latching arm 201 and the gear 197 are in the angularly turned positions about the supporting shaft 195 indicated by the dot-and-dash lines in Figs. 16 and 17. The latching arm 201 was moved from its full line position in these views to the dot-and-dash line position by motion transmitted thereto from the rocker arm 102 through the sprocket 192, chain 193 and sprocket 194 when the starting speed disc clutch is moved to its engaged or running position, the detent 204 riding on the adjacent peripheral surface of the gear 197 which then is in the position shown by the full lines. Subsequently, when the rocker arm 80 is swung from its full line to its dot-and-dash line position, Fig. 16, to throw in the synchronizing jaw clutch as hereinbefore has been explained, the gear 197 will be turned angularly about the axis of the shaft 195 until the notch 205 in its periphery is in position to be engaged by the latching detent 204. At this time, the arms 112 and 113 and the rollers 114 and 115, respectively, on the free ends thereof will occupy the positions shown by the dot-and-dash lines of Fig. 16. With this relationship of the parts, if the disc clutch is disengaged, the jaw clutch must also positively disengage and it also is impossible for the jaw clutch to be independently disengaged.

The control mechanism comprises adequate operational and safety provisions for efficient service and to take care of any situation that is likely to be encountered in service.

As shown in Fig. 20, a supply pipe 206 for air under a predetermined suitable pressure, as clean, dry compressed air at 50 lbs. per square inch, has a branch 207 leading to an air valve 208 operable by a connected solenoid 209, as indicated by the caption "Solenoid air valve." The air valve 208 has its output side operatively connected by an air line 210 to the intermediate portion of a spool valve 211 which is operable by a connected solenoid 212, the assembly being marked, "Disc clutch control valve." The valve 211 has output lines 213 and 214, respectively, leading from opposite end portions of the spool valve to the rearward and forward ends, respectively, of the "Disc clutch cylinder" 106. The spool valve 211 functions in a conventional manner so that the output lines 213 and 214 are connected alternately with the input line 210 and each is connected with the atmosphere when not connected with the input line 210.

The air line 207 has a branch 215 leading to an intermediate portion of a spool valve 216 which is like the spool valve 211 and is operable by a connected solenoid 217, the assembly being designated "Jaw clutch control valve." The air output lines of the valve 216 are designated 218 and 219, respectively, and lead to the forward and rearward ends, respectively, of the "Jaw clutch cylinder" 84. The air output line 219 which leads to the rearward end of the cylinder 84, i. e., the end opposite that from which the piston rod 83 projects and to which air under pressure is supplied to operate the cylinder 84 to effect disengagement of the jaw clutch, has a branch 220 operatively connected to one end of a piston type spool valve 221 which is designated "Delivery scoop control valve." This valve receives air from the main line 206 through connected branch lines 222 and 223, the latter being operatively connected to an intermediate portion of such valve. The branch line 222 has a branch 224 operatively connected with an air pressure operable "Pressure switch" 225 and another branch 226 leading to an "Air pressure gauge" 227. The pressure switch 225, the air pressure gauge 227 and the intermediate portion of the control valve 221 thus are all continuously in communication with the air supply pipe 206.

The control valve 221 is provided at its opposite side from the pipe 223 and at a place spaced longitudinally of such valve toward the end thereof supplied with operating air from the pipe 220 with an output air line 228 leading through a check valve 229 to one end of a piston type spool valve 230 for directly controlling the operation of an air cylinder 231, marked "Scoop operating cylinder." This cylinder has a piston rod 232 operatively connected by a link 233 with a pivoted "Selective delivery scoop" 234. The scoop 234, when in its lowered position as shown in Fig. 20, will direct charges produced by the feeder (not shown) to cullet. When this scoop has been raised to alignment with a fixed position charge delivery chute or trough 235, it will be in its active position for delivery of charges to the molds of the forming machine at a loading station (not shown). The valve 230 is provided at one side with an intermediately located operating air intake line 236 and with spaced exhaust lines 237 and 238 which respectively are nearer to the opposite ends of the valve 230. At its opposite side, the valve 230 is operatively connected by air output lines 239 and 240, respectively, with the rearward and forward ends, respectively, of the scoop operating cylinder 231. A compression coil spring 241 acts on the longitudinally movable spool valve member 230a at the end of the latter opposite that receiving air under pressure from the line 220. It will be understood that when the valve member 230a is in the position shown in Fig. 20, the output line 240 will be supplied with air from the intake line 236 so that the operating cylinder 231 will maintain the scoop in its lowered, cullet delivery position. When the movable valve member 230a is at the opposite end of its stroke in the valve 230 from the position shown in Fig. 20, air through the line 236 will pass through the line 239 to the rearward end of the cylinder 231 so as to hold the scoop in its raised, charge delivering position. The scoop must be raised manually after it has been lowered automatically when the forming machine has stopped. As hereinafter will become apparent, a control tie-in prevents raising of the scoop until the forming machine and feeder are running in synchronous relation.

An air line 228a controlled by a normally closed valve (not shown) on the machine may be joined to line 228 when a charge from the feeder which normally would go to a mold on the machine during synchronous operation is to be diverted to cullet instead; a throw-out cam (not shown) on the machine is moved from a normally inactive position to position to open the normally closed valve temporarily at the appropriate time in each cycle to admit air through the line 228a to line 228 and to the lower end of valve 230 so as temporarily raise the piston valve 230a to the position shown in Fig. 20. The mechanism involved and not shown is conventional.

The solenoids 209, 212 and 217 are all de-energized as shown in Fig. 20. The valve 208 which is operable by the solenoid 209 will then be open. The movable valve members 211a and 216a of the valves 211 and 216, respectively, will then be in their projected positions in relation to their connected solenoids. In this situation, air from the pipe 206 will be permitted to pass through the pipe 213 to the rearward end of the disc clutch cylinder 106 so that the piston rod 105 of that cylinder will be in its projected position and the machine starting speed disc clutch will be disengaged. At the same time, air will be permitted to pass from the valve 216 through the pipe 219 to the rearward end of the jaw clutch cylinder 84 and the synchronizing speed jaw clutch also will be disengaged. The movable member 221a of the valve 221 now is maintained at the far end of the valve from its connection with the pipe 220. Air is permitted to pass from the supply line 206 through the lines 222 and 223, valve 221, line 228 to the valve 230 and air is supplied by the latter to the cylinder 231 which maintains the pivoted delivery scoop 234 in its lowered position where it directs glass charges to cullet.

The movable member 221a of the valve 221 may be moved from the position shown in Fig. 20 to the opposite end of the valve by a spring loaded push rod 242 when conditions will permit. These do not arise, however, until the starting speed disc clutch and the synchronizing speed jaw clutch have both been moved to engaged positions and the forming machine is being driven in synchronism with the feeder. In accomplishing this result, the solenoids 212 and 217 are energized as presently will be explained to raise the movable members 211a and 216a of the valves 211 and 216 in proper sequence from the positions shown in Fig. 20. This will cause operating air to be supplied to the forward ends of the cylinders 106 and 84 to move the starting speed disc clutch and the synchronizing speed clutch to engaged or running positions in the proper sequence and at the proper times. Also, raising of the movable valve member 216a of the jaw clutch control valve 216 will shut off air from the line 220 leading to one end of the delivery scoop control valve 221 and the movable member 221a of that valve may then be moved to the limit of its stroke to the left as viewed in Fig. 20, thereby trapping air from the connected line 223 in the valve 221 and cutting off flow of air from that valve 221 through the line 228 to the valve 230. The spring 241 then may function to move the valve member 230a of the valve 230 to the opposite end thereof of that shown in Fig. 20 and air then will be supplied by the valve 230 to the opposite end of the cylinder 231 from that shown in Fig. 20. The scoop 234 thus may be raised and maintained in its raised position until the forming machine is stopped when the scoop 234 will be lowered automatically. A spring loaded push rod 243 may be provided at the end of the valve 221 to which the air line 220 is connected to push or aid movement of the movable member 221a to the position shown in Fig. 20.

The motor 123, Figs. 1 and 19, is an electric motor, preferably of a constant speed type. A motor operating circuit, Fig. 19, may comprise electrical power lines L-1, L-3 and L-2, a motor circuit breaker 244 which may be any conventional manually openable and closable switch mechanism, and an electromagnetic motor circuit controlling switch 245 interposed between the circuit breaker and the motor. A motor starting switch 246 may be of a push button type. A wire 247 leads from one side of the starting switch 246 to one side of a holding switch 248 which is connected with the motor switch 245 to be opened and closed with the latter. The opposite side of the switch 248 is connected by a wire 249 with the second side of the starting switch 246. A branch wire 250 of the wire 247 leads to one end of the coil 251 of the motor switch 245, the other end of that coil being connected by an electrical conducting line 252, which may include a closed switch 252a, with one of the power lines, as the line L-3. The second side of the switch 246 is connected by a wire 253 with a push button type motor stop switch 254 which is connected by a wire 255 with the power line L-2. When the push button stop switch 254 is closed as shown and the motor start switch 246 is actuated, the motor switch 245 will close to start the motor 123 and will remain closed to keep the motor running until it is stopped by opening of the motor stop switch 254 or other suitably connected safety or other known means to stop such motor.

The control mechanism includes a dual switch mechanism 256 for selectively setting up conditions for hand operation of the forming machine or for automatic operation. This switch mechanism comprises two connected switches 257 and 258, respectively, connected as indicated at 259 so that opening of one will close the other and vice versa. The switch 257 is for hand operation and is connected at one side to a power line L-3 and at its other side by a wire 260 to one side of the centrifugal switch 148. The other side of the centrifugal switch 148 is connected by a wire 261 to one end of a coil 262a of an electromagnetic switch 262, designated "Air valve contactor." The other end of the coil 262a is connected by a wire 263 to power line L-1. One side of the switch 262 is operatively connected by a wire 264 to the hereinbefore mentioned solenoid 209 for controlling the operations of the air valve 208. The other side of the switch 262 is connected by a wire 265 to the power line L-1 and the solenoid 209 is operatively connected to the power line L-3. With this arrangement, when the hand switch 257 has been moved from its open position as shown in Fig. 19 to its closed position, the resultant circuit through the centrifugal switch 148, the machine then being at rest, will close the electromagnetic air valve contactor 262 and thus effect energization of the solenoid 209 which controls the air valve 208. As hereinbefore stated, the air valve 208 is open when the solenoid 209 is de-energized and consequently will be closed when the hand operation switch 257 has been closed, thereby preventing admission of air to the disc clutch cylinder through valve 211, thus insuring against accidental and unintended operation during any period of manual turning of the machine for initial adjustments or any other purpose.

For mechanical operation, the automatic operation switch 258 is closed, as shown in Fig. 19, thereby opening the hand operation switch 257 and breaking the circuit leading to the solenoid 209 of the solenoid air valve so that the air valve will be opened and operating air will be available to the air system as required.

The automatic operation switch 258 has one side thereof connected by a wire 266 with one side of a switch 267 which is connected with the motor circuit holding switch 248 and with the electromagnetic motor switch 245 so as to be opened and closed in unison therewith. The other side of the switch 267 is connected electrically in series with a plurality of stop switches, including the "Manual movement shaft cover switch" 121, a "Safety switch" indicated at 268, a push button stop switch 269 at a "Machine push button station," S-1. A second stop switch 270 is at a second "Machine push button station," S-2 which may be located at a substantial distance from the first push button station.

These and other electrical elements of the machine circuit, suitably connected as will be explained, may receive electric power from lines L-1 and L-3, acting through a machine circuit breaker 271. A continuation of the line L-1 at the output side of the circuit breaker 271 is connected to one side of the stop switch 270. The opposite side of the stop switch 270 is connected by a wire 272 with one side of a switch 273 of the hereinbefore mentioned air pressure switch 225. The opposite side of the switch 273 is connected by a wire 274 with the second side of the automatic operation switch 258. The second side of the stop switch 269 is connected by a wire 275 with one side of a push button starting switch 276 at the first machine push button station, S-1. That same side of the starting switch 276 is connected by a wire 277 with the corresponding side of a starting switch 278 of the second machine push button station, S-2. The second side of the switch 276 is connected by a wire 279 to the second side of the starting switch 278. The machine starting switches 276 and 278 thus are in parallel so that either may be employed for machine starting operations. Their connecting wires 277 and 179, respectively, are connected by wires 280 and 281, respectively, with an electromagnetic switch mechanism 282, marked "Disc clutch contactor."

The contactor 282 is electrically connected by a wire 283 with the solenoid 212 for operating the disc clutch control valve 211, Fig. 20. The disc clutch contactor 282 also is operatively connected by a wire 284 with one side of a time delay relay generally indicated at 285, the other side of which is connected by a wire 286 with the solenoid 183 for operating the lever and linkage system controlling the relative axial movements of the timing discs 161 and 166 toward and away from each other. The disc clutch contactor 282 is operatively connected with the machine circuit breaker 271 through power line L-3 and is electrically interconnected with the time delay relay 285 through the aforesaid wire 284 and power line L-1. The contactor 282 also is interconnected operatively, as by a wire 287 and power line L-1, with an electromagnetic switch mechanism 288, termed a "Jaw clutch contactor." The latter is operatively connected, as by a wire 289, with the hereinbefore mentioned solenoid 217 for controlling the jaw clutch control valve 216, Fig. 20. The coil of the jaw clutch contactor 288 is operatively connected, as by a wire 290, with the synchronizing micro-switch 189.

The generator 146 is electrically connected, as by wires 291 and 292, with a speed indicator 293. The latter may show speed of the driven machine shaft in terms of charges per minute produced by the connected driven feeder and to give other pertinent related data.

From the foregoing description of the control mechanism and the operating parts of the synchronizing mechanism, the operation thereof will be readily understood. The buttons on the timing discs 161 and 166 will be aligned at a time in the operations of the forming machine and the feeder fixed in relation to the instant of delivery to a mold of the forming machine at a loading station of a charge produced by the feeder when the forming machine and feeder are operating in synchronous relation with each other. In other words, the feeder and forming machine are being operated in suitable phase relation with each other to assure delivery to the molds of the forming machine of charges produced by the feeder. It hereinbefore has been pointed out that the disc 166 is turned at a rate of one revolution for each production of a charge by the feeder while the feeder is in operation. This also corresponds with the time interval between presentation of successive molds of the forming machine at the loading station. If now, the forming machine is stopped while the feeder continues in operation, the synchronizing drive mechanism of the invention as described can be actuated to start and effect resumption of driving of the forming machine in synchronous relation with the feeder and in the same phase relation therewith as existed previously, assuming that no alterations of the operations of the feeder have been made in the meantime. The machine may be started by pushing the starting button at either of the machine push button stations S-1 or S-2 to bring about the result just mentioned provided that the motor is running, the solenoid air valve is open, the cover of the manual movement shaft is down so as to close the switch 121, and the air pressure in the air system is high enough to operate both the starting speed disc clutch and the synchronizing speed jaw clutch cylinders. By operating either machine push button starting switch, the disc clutch contactor 282 will be closed, thereby energizing the solenoid 212 and operating the disc clutch control valve 211. Air then will be admitted to the forward end of the disc clutch cylinder 106 to move the disc clutch to running position. Simultaneously, the time delay relay 285 will be energized and after the predetermined delay time has elapsed, the solenoid 183 of the synchronizing switch mechanism will be energized, thereby moving the cam discs 161 and 166 together. When the cam buttons on these discs come in line, the micro-switch 189 will be closed, thereby effecting energization of the magnetic coil of the jaw clutch contactor 266, consequent energization of the solenoid 217 of the jaw clutch valve mechanism and operation of the jaw clutch control valve 216. Air thus will be admitted to the forward end of the jaw clutch cylinder 84 to move the synchronizing speed jaw clutch to its engaged or running position. The machine shaft, which is then being driven at a speed of 14/15 that of the power input shaft 1 will now be driven at full synchronous speed and the operations of the forming machine and the feeder will be synchronized and in phase. The time after the machine starting button is pressed until the jaw clutch is thrown in may vary according to the relative positions of the buttons on the two timing discs when the timing discs are moved together. The buttons on the faster rotating disc 166 will catch up with the buttons on the slower disc at a time which may vary from one complete revolution of the faster disc to 15 revolutions thereof or, in other words, may vary for the time of production of from one to fifteen charges by the feeder. During this time, the delivery scoop is in position to divert the charges to cullet and cannot be raised to its active charge delivery position until the jaw clutch has been thrown in and the synchronous speed and phase relationship between the feeder and forming machine has been restored.

To stop the operation of the forming machine, any one of the stop switches 121, 268, 269 or 270 may be actuated. The air valve contactor 262 is energized through the centrifugal switch and consequently the machine must be almost at rest before the solenoid air valve can be closed to shut off air to the disc clutch cylinder. This assures firm braking action when the brake disc clutch is moved to its braking position from its running position.

The safety stop switch 268 may be an emergency switch and may be provided on the safety gate (not shown) of the forming machine for which the synchronizing mechanism is adapted and may be provided with known provisions (not shown) for stopping the motor by reversing the operating current so that the motor will act as a brake. Stopping of the motor would, of course, stop the feeder also.

It hereinbefore has been pointed out that the several means for operating the disc clutch and the jaw clutch are interlocked both electrically and mechanically and the mechanical interlock prevents disengagement of the jaw clutch independently of the disc clutch and assures that if the disc clutch is disengaged then the jaw clutch also must positively disengage.

The air pressure in the air system is shown by the gauge 227 and if this air pressure falls below a predetermined amount which is required to be adequate for operation of both the disc clutch cylinder and the jaw clutch cylinder, then the pressure switch 273 will be automatically opened, thereby stopping the machine.

Many changes in and modifications of the illustrative embodiment of the invention shown in the drawings and herein described will now be obvious or readily occur to those skilled in the art and I, therefore, do not wish to be limited to the details of such embodiment.

I claim:

1. A synchronizing drive for two separate machines comprising a shaft driven at a predetermined substantially constant speed, a shaft to be driven to operate one of said machines, motion transmitting means connecting said shafts to drive the said second shaft at a predetermined speed appropriate for the machine driven thereby, a shaft to be driven to operate the second of said machines, motion transmitting means operable at will to establish a driving connection between said first shaft and said third shaft to start and drive the latter at a speed less than that required for synchronous operation of said two machines, and additional motion transmitting means operable automatically during continued operation of said first shaft at its said substantially constant speed to drive the third shaft from the first shaft at a relatively higher synchronous speed after driving of said third shaft at a lower speed has been initiated.

2. A synchronizing drive for two separate machines comprising a power input shaft rotating at a predetermined substantially constant speed, a power output shaft for operating one of said machines, a driving connection between said input shaft and said output shaft, a second power output shaft for operating the other of said machines, a starting speed motion transmitting means, including a clutch, to drive the second output shaft from the input shaft at a speed less than the desired synchronizing speed when said clutch is engaged, means operable at will to engage said clutch, a synchronizing speed motion transmitting means, also including a clutch, to connect the input shaft operatively with the second-named output shaft to drive the latter at the desired synchronizing speed when said second-named clutch is engaged, and automatic means operable during continued operation of said power input shaft at its said substantially constant speed to engage said second-named clutch after said first clutch has been engaged.

3. A synchronizing drive for two separate machines comprising a power input shaft rotating at a predetermined substantially constant speed, a power output shaft for operating one of said machines, a driving connection between said input shaft and said output shaft, a second power output shaft for operating the other of said machines, a starting speed shaft, means including a starting speed clutch and a free wheeling clutch to transmit motion from the power input shaft to the starting speed shaft to drive the latter at a starting speed slightly less than that of the power input shaft, motion transmitting means interconnecting the starting speed shaft with said second power output shaft to drive the latter at said starting speed when the starting speed clutch is engaged, a synchronizing speed clutch on said second power output shaft comprising a clutch part secured to said shaft to rotate therewith and a cooperative clutch part loose on the shaft and slidable thereon from an inactive position to engage the first clutch part, gear means connecting said input shaft with the slidable clutch part on the second-named output shaft to drive the latter at the same speed as the power input shaft, manually operable means to engage the starting speed clutch, and means having a controlled connection with said manually operable means to act automatically on actuation thereof to effect engagement of the movable clutch part on the second power output shaft with its cooperative clutch part to drive the latter shaft in the same synchronous speed and phase relation with the power input shaft that existed when operation of the second power output shaft was interrupted.

4. In a synchronizing drive of the character described, a power input shaft rotating at a predetermined substantially constant speed, a power output shaft having a driven connection with said power input shaft so that said power output shaft is rotated simultaneously with the power input shaft, a second power output shaft, a starting speed countershaft having a driving connection with the second power output shaft to drive the latter at the same speed as the starting speed shaft, motion transmitting means including a free wheeling clutch and a starting speed clutch for driving the starting speed shaft from the power input shaft at a speed slightly less than that of the power input shaft when the starting speed clutch is engaged, a synchronizing speed motion transmitting means including a synchronizing speed clutch to drive the second power output shaft from the power input shaft at the speed of the latter when said synchronizing speed clutch has been engaged, manually operable means to effect engagement of the starting speed clutch, and automatic means responsive to actuation of said manually operable means to effect engagement of the synchronizing speed clutch during continued rotation of said power input shaft at its said substantially constant speed at a predetermined time after actuation of said manually operable means.

5. A synchronizing drive as defined by claim 4 wherein said automatic means includes timing means constructed and arranged to vary the time at which engagement of the synchronizing speed clutch is effected after actuation of the manually operable means according to the time required for restoration, by the mere act of engaging the synchronizing speed clutch, of a pre-existing phase relation between a machine driven by the first output shaft and an operationally related machine driven by the second output shaft.

6. In a synchronizing drive of the character described, a power input shaft rotating at a predetermined substantially constant speed, a power output shaft having a driven connection with said power input shaft so that said power output shaft is rotated simultaneously with the power input shaft, a second power output shaft, a starting speed countershaft having a driving connection with the second power output shaft to drive the latter at the same speed as the starting speed shaft, motion transmitting means including a free wheeling clutch and a starting speed clutch for driving the starting speed shaft from the power input shaft at a speed slightly less than that of the power input shaft when the starting speed clutch is engaged, a synchronizing speed motion transmitting means including a synchronizing speed clutch to drive the second power output shaft from the power input shaft at the speed of the latter when said synchronizing speed clutch has been engaged, manually operable means to effect engagement of the starting speed clutch, and automatic means responsive to actuation of said manually operable means to effect engagement of the synchronizing speed clutch at a predetermined time after actuation of said manually operable means, said automatic means comprising two axially relatively movable discs confronting and relatively adjacent to each other, one of said discs having a driven connection with said power input shaft so as to be rotated continuously when the power input shaft is rotating at a speed reduced to one revolution per cycle of operations of a machine operated by the first-named power output shaft, the second disc having a driven connection with the starting speed shaft to be driven when the latter is rotating at a correspondingly reduced speed, projecting cam elements on the adjacent faces of said discs, the extent of projection thereof being such that cam elements on the two discs overlap when the discs have been moved axially to their nearest positions in respect to each other, automatic means activated by the actuation of said manually operable means to move said discs axially relative to each other to their said nearest positions and to permit one of said discs to be cammed axially away from the other disc when the cam elements on said discs are moved into engagement with each other by the rotating discs, and means operable by the thus axially cammed disc to effect engagement of the synchronizing speed clutch.

7. A synchronizing drive as defined by claim 6 wherein the means operable by the axially cammed disc comprises a normally open electric switch, means actuated by the axially cammed disc to close said switch, and means rendered effective by the closing of said switch to effect engagement of the synchronizing speed clutch.

8. A synchronizing drive comprising a power input shaft rotating at a predetermined substantially constant speed, a power output shaft for operating a machine, said output shaft having a driven connection with the input shaft so as to be rotated at a speed appropriate for operations of said machine, a second power output shaft for operating a second machine, a starting speed motion transmitting means, including a clutch, to drive the second output shaft from the input shaft when said clutch is engaged at a speed less than required for synchronous operations of said two machines, means operable at will to engage said clutch, a synchronizing speed motion transmitting means, also including a clutch, to connect the input shaft operatively with the second-named output shaft to drive the latter at the desired synchronizing speed when said second-named clutch is engaged, and control means including means acting automatically in response to actuation of the means to engage the clutch of the starting speed motion transmitting means to effect engagement of the clutch of the synchronizing speed motion transmitting means during continued rotation of the power input shaft at its said substantially constant speed and after a period of delay adequate to insure restoration of the pre-existing phase relation between the operations of the feeder and of the forming machine when the clutch of the synchronizing speed motion transmitting means is engaged.

9. A synchronizing drive as defined by claim 8 wherein the said control means comprises a system of operatively connected electrical, pneumatic and mechanical elements, including manually operable means to effect disengagement of said clutches to stop said second power output shaft while the input shaft is rotating, and safety provisions acting automatically to effect the same result and to prevent restarting of said second power output shaft when operating conditions have become abnormal.

10. A synchronizing drive as defined by claim 8 wherein said control means includes pneumatically operable devices and a pressure switch acting automatically when the air pressure for operating said pneumatically operable devices falls below a predetermined operating pressure to stop the second power output shaft and to prevent re-starting thereof while said abnormally low air pressure condition exists.

11. A synchronizing drive as defined by claim 8 wherein said control means includes an electric interlock between the respective means for operating the starting speed clutch and the synchronizing speed clutch to prevent improper sequence of engagement of these clutches and to prevent disengagement of either clutch independently of the other.

12. A synchronizing drive as defined by claim 8 wherein the respective means for operating the starting speed clutch and the synchronizing speed clutch includes a mechanical interlock for preventing disengagement of the synchronizing speed clutch independently of the starting speed clutch and to assure disengagement of the synchronizing speed clutch also if the starting speed clutch is disengaged.

13. A synchronizing drive as defined by claim 8 wherein said control means includes a braking device comprising a fixed braking clutch member and a cooperative movable braking clutch member connected to the starting speed clutch to be moved into braking engagement with the fixed braking clutch member when the starting speed clutch is disengaged, said movable braking clutch member being connected to the starting speed shaft to rotate therewith so that said shaft and the parts having driven connections therewith will be braked to a stop when the members of the braking clutch are operatively engaged with each other.

14. A synchronizing drive as defined by claim 8 and, in addition, a manually operable shaft connected to the starting speed shaft, and safety means to prevent manual actuation of said manually operable shaft when said clutches are engaged and until said starting speed shaft and the parts driven thereby have come to a stop.

15. A synchronizing drive as defined by claim 14 wherein said safety means comprises a normally open electric switch in a circuit included in the control means for operating said clutches, a vertically raisable pivoted cover adapted when lowered to enclose the portion of said shaft to which a wrench may be applied when access thereto is possible, said cover when lowered also serving to close said switch, whereby raising of the cover will break the control circuit which includes said switch and will preclude engagement of the clutches until the cover has been lowered.

16. A synchronizing drive as defined by claim 8 and, in addition thereto, a speed indicator operatively connected with the second power output shaft.

17. A synchronizing drive as defined by claim 8 wherein said control means includes a switch adapted when closed to permit manual operation of said starting shaft and to prevent automatic operation to effect engagement of said clutches and a second switch adapted when closed to permit said automatic operation, said switches being operatively connected so that opening of either will close the other and vice versa, a normally open electromagnetic air valve controlling supply of operating air to pneumatic devices of the control means, a centrifugal switch having a driven connection with the second-named power output shaft so as to be opened when that shaft is rotating at a speed above that of manual operation, and electric circuit forming means connecting the manual operation switch, the centrifugal switch and the electromagnetic air valve to effect closing of the latter when the manual operation switch is closed so as to prevent admission of live operating air to any of the pneumatically operable devices of the control means during any period of manual operation of the starting shaft and of the parts having a driven connection therewith.

18. A synchronizing drive for two separate machines comprising a power input shaft, a prime mover, driving connections including an overload release clutch between the prime mover and the power input shaft to rotate the latter at a predetermined, substantially constant speed, a power output shaft for operating one of said machines, a driving connection including a speed reducing differential between the input shaft and the output shaft, a second power output shaft for operating the other of said machines, a starting speed motion transmitting means, including a clutch, to drive the second output shaft from the input shaft at a speed less than the desired synchronizing speed, means operable at will to engage the clutch of the starting speed motion transmitting means, a synchronizing speed motion transmitting means, also including a clutch, to connect the input shaft operatively with the second-named output shaft to drive the latter at the desired synchronizing speed when said second-named clutch is engaged, and control means operatively interconnected with the manually operable means for engaging the starting speed clutch to effect engagement of the synchronizing speed clutch during continued rotation of the power input shaft at its said substantially constant speed at a time automatically determined after actuation of the said manually operable means.

19. A synchronizing drive for two separate machines comprising a power input shaft rotating at a predetermined substantially constant speed, a power output shaft for operating one of said machines, a driving connection between said input shaft and said output shaft, a second power output shaft for operating the other of said machines, a starting speed motion transmitting means, including a clutch, to drive the second output shaft from the input shaft at a speed less than the desired synchronizing speed when said clutch is engaged, means operable at will to engage said clutch, a synchronizing speed motion transmitting means, also including a clutch, to connect the input shaft operatively with the second-named output shaft to drive the latter at the desired synchronizing speed when said second-named clutch is engaged, and automatic means to engage said second-named clutch after said first clutch has been engaged, said automatic means comprising cooperative timing elements operable by the power input shaft and the second output shaft, respectively, to time the engagement of the second-named clutch automatically to restore the same phase relationship between said two machines as existed when operation of the machine driven by the second power output shaft was interrupted.

20. A synchronizing drive for two separate machines comprising a power input shaft rotating at a predetermined substantially constant speed, a power output shaft for operating one of said machines, a driving connection between said input shaft and said output shaft, a second power output shaft for operating the other of said machines, a starting speed motion transmitting means, including a clutch, to drive the second output shaft from the input shaft at a speed less than the desired synchronizing speed when said clutch is engaged, means operable at will to engage said clutch, a synchronizing speed motion transmitting means, also including a clutch, to connect the input shaft operatively with the second-named output shaft to drive the latter at the desired synchronizing speed when said second-named clutch is engaged, and automatic means to engage said second-named clutch after said first clutch has been engaged, said automatic means comprising an air motor having an operating connection with said second-named clutch, a normally open electric switch, means rendered effective by closing of said switch to supply operating air to said air motor to operate it to effect movement of said second-named clutch from an inactive, disengaged position to its active, engaged position, and switch closing means comprising relatively movable cooperative elements operable by said power input shaft and said starting speed motion transmitting means, respectively, to co-act to close said switch at an automatically predetermined time after the clutch of said starting speed motion transmitting means is engaged.

21. A synchronizing drive comprising a power input shaft rotating at a predetermined substantially constant speed, a power output shaft for operating a glass feeder, said output shaft having a driven connection with the input shaft so as to be rotated at a speed appropriate for operations of the glass feeder, a second power output shaft for operating a glassware forming machine for the manufacture of glassware from charges produced by the feeder, a starting speed motion transmitting means, including a clutch, to drive the second output shaft from the input shaft when said clutch is engaged at a speed less than required for synchronous operations of the feeder and forming machine, means operable at will to engage said clutch, a synchronizing speed motion transmitting means, also including a clutch, to connect the input shaft operatively with the second-named output shaft to drive the latter at the desired synchronizing speed when said second-named clutch is engaged, and control means including means acting automatically in response to actuation of the means to engage the clutch of the starting speed motion transmitting means to effect engagement of the clutch of the synchronizing speed motion transmitting means after a period of delay adequate to insure restoration of the pre-existing phase relation between the operations of the said machine and of the said second machine when the clutch of the synchronizing speed motion transmitting means is engaged, said control means including pneumatic means controlling the position of a vertically swingable pivoted charge directing scoop which is adapted when in a relatively raised position to direct charges produced by the feeder appropriately for delivery to the forming machine and when in a lowered position to direct the charges produced by the feeder to cullet, said pneumatic means acting automatically to cause said scoop to drop to its cullet directing position when said clutches are disengaged and to prevent raising of the scoop to its position to direct charges to the forming machine until said synchronizing speed clutch has been engaged.

BERNARD H. KOOB.

REFERENCES CITED

The following references are of record in the file of this patent:

UNITED STATES PATENTS

| Number | Name | Date |
|---|---|---|
| 1,376,467 | Simmon | May 3, 1921 |
| 1,734,491 | Keller | Nov. 5, 1929 |
| 1,781,978 | Davis | Nov. 18, 1930 |
| 2,266,838 | Winn | Dec. 23, 1941 |
| 2,384,498 | Sloan | Sept. 11, 1945 |
| 2,427,135 | Giner | Sept. 9, 1947 |
| 2,497,302 | Fritzsch | Feb. 14, 1950 |